May 12, 1925.  
C. W. WEISS  
TRANSMISSION DEVICE  
Filed Sept. 13, 1922

1,537,515

INVENTOR  
Carl W. Weiss  
BY  
Redding Greeley  
ATTORNEYS

Patented May 12, 1925.

1,537,515

UNITED STATES PATENT OFFICE.

CARL W. WEISS, OF BROOKLYN, NEW YORK, ASSIGNOR OF ONE-HALF TO CLARENCE B. STURGES, OF FAIRFIELD, CONNECTICUT.

TRANSMISSION DEVICE.

Application filed September 13, 1922. Serial No. 587,897.

*To all whom it may concern:*

Be it known that I, CARL W. WEISS, a citizen of the United States, residing in the borough of Brooklyn, of the city of New York, of the State of New York, have invented certain new and useful Improvements in Transmission Devices, of which the following is a specification, reference being had to the accompanying drawing, forming a part hereof.

In another application of the present applicant for Letters Patent of the United States, Serial No. 564,700, filed May 24, 1922, there is shown and described and covered broadly a transmission device of novel construction together with a torque governor by which variation of the speed ratio is effected automatically through variation of the torque or resistance of the driven element. In Letters Patent of the United States, granted to the present applicant, No. 1,141,508, dated June 1, 1915, and No. 1,146,982, dated July 20, 1915, there is shown and described a transmission device which, as the transmission device shown and described in the application above mentioned, comprises a rotatable mutor and a co-operating element concentric with the mutor, with means to vary the relative angular axial position of said elements together with suitable connections, one of the co-operating elements mentioned having a movement of nutation. The present invention is concerned particularly with a special application of a torque governor to a transmission device, the torque governor chosen in the present application as an embodiment of the invention being somewhat of the character of that covered broadly in the application above mentioned and shown more particularly in another application Ser. No. 587,895, (case A), while the form of transmission device to which in the present application the torque governor is shown as applied, is of the nutating type shown in the Letters Patent above mentioned. In the present instance the torque control is shown as located between the driving member and the variable speed transmission device, the relative angular relation of the elements of which is influenced by the torque control, but as will be readily understood, the torque control might be located between the variable transmission device and the driven member. The invention will be more fully explained hereinafter with reference to the accompanying drawing in which it is illustrated and in which—

Figures 2 and 3 are detail views illustrating particularly the construction and support of the gripping elements.

Figure 1:
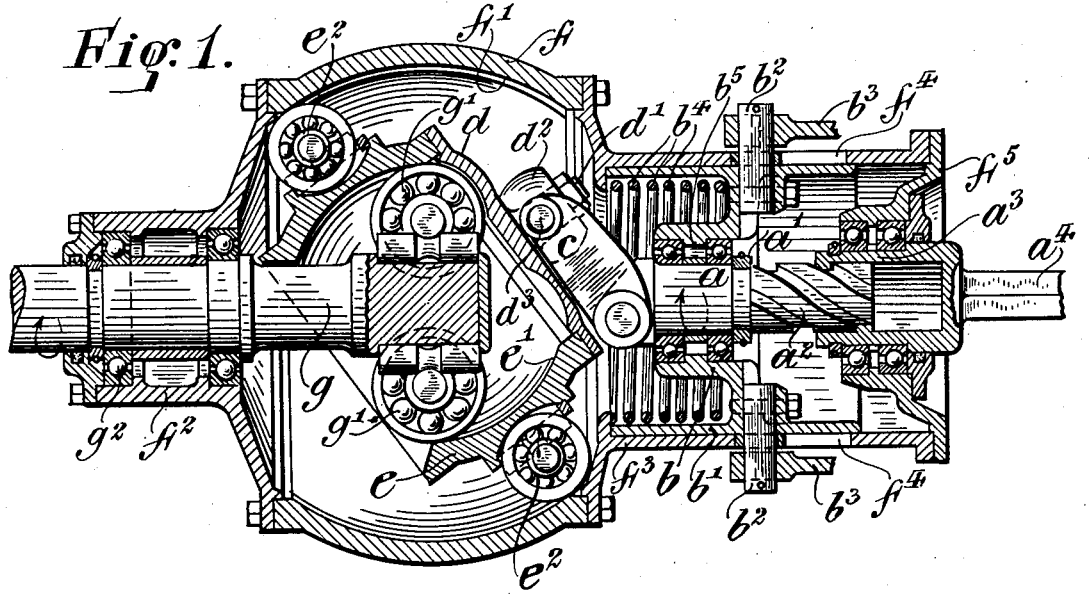
Figure 1 is a view in longitudinal, sectional elevation of a transmission device which embodies the invention.
Figure 2:
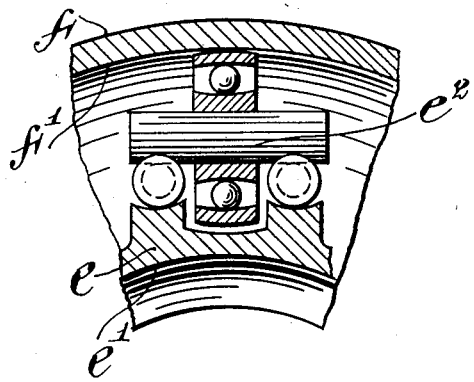

The transmission device, without the torque control, may be constructed substantially as described in the Letters Patent above mentioned. As shown, the driving part $a$ is mounted for rotation in a bearing $b$ which is movable longitudinally. Pivoted upon the end of the shaft $a$ is an unbalanced link $c$ by which the movement of nutation is imparted from the driver $a$ to the nutating body or mutor $d$, the link $c$ having a form of universal joint with the mutor. In the construction shown an axial stud $d'$ of the mutor receives freely a collar $d^2$ which has trunnions $d^3$ on which the end of the link $c$ is pivotally mounted.

The mutor is shown in this instance as having a shell $e$ which has an internal spherical bearing surface $e'$ and carries externally the gripping elements $e^2$, freely rotatable in radial planes of the mutor. The latter co-act, as described in said Letters Patent, with the internally spherical working surface $f'$ of the co-operating element $f$, which, in the construction shown, forms part of the housing.

The driven shaft or member $g$ is also armed with gripping elements $g'$ which are freely rotatable in radial planes of the shaft $g$ and co-act with the internal spherical working surface $e'$ of the shell $e$. The shaft $g$ is shown as having a suitable bearing at $g^2$ in the member $f^2$ of the housing.

The transmission device thus described operates as fully set forth in said Letters Patent and requires no further description or explanation herein, it being noted, however, that for a purpose to be referred to the link $c$ is unbalanced so that, when the link $c$ is in its zero position, in alignment with the shaft $a$ and the shaft $a$ is rotated, the link shall be subject to centrifugal action.

The bearing $b$ for the driving member $a$, as stated above, is longitudinally movable, being carried, in the construction shown, by a sleeve $b'$ which is movable longitudinally in the sleeve-like member $f^3$ of the housing, the latter being slotted longitudinally, as at $f^4$, to permit the movement of studs $b^2$ which are secured to the sleeve $b'$ and are engaged externally by the fork members $b^3$ of a manual control lever which may be of any suitable character and arranged to be operated in any convenient manner. Means are provided for pressing the bearing $b$ normally toward the right, that is, toward its zero position, a coiled spring $b^4$ being shown as provided for this purpose.

The driving shaft $a$ is also movable longitudinally with the bearing $b$, which may be shouldered, as at $b^5$, to cooperate with the bearing rings of the shaft, the latter being also provided with a collar $a'$. The shaft or driving member $a$ also forms part of a longitudinally extensible shaft or torque-responsive element, the member $a$ being formed with a reversible helix $a^2$ which is engaged with a corresponding female member $a^3$ which is mounted in a suitable bearing supported by the end plate $f^5$ of the housing, the female member being longitudinally immovable and adapted to have the rotating force applied thereto. As shown it is provided with a polygonal extension $a^4$ for engagement with a driving pulley or crank.

In the drawing the parts are shown in the relative positions which they assume when the speed of the driven member $g$ is maximum with respect to the driver $a^4$. If it be assumed, however, that the parts are in position for zero speed of the driven member $g$, then the two parts of the torque-responsive element will be in contracted relation, the member $a^2$ being entered fully within the member $a^3$, and the bearing $b$ being in its extreme right hand position, the link $c$ will be in alignment with the driving shaft $a$ and the mutor $d$ will stand with its axis also in alignment with the shaft $a$ and the shaft $d^3$. Under these conditions the collar $d^2$ may rotate freely around the stud $d'$ without imparting any movement of nutation to the mutor $d$. If it be assumed now that movement of rotation is imparted to the extensible shaft or torque-responsive element $a$, $a^2$, $a^3$, and the speed of such movement of rotation be sufficient, the action of centrifugal force on the unbalanced link $c$ will throw the link out of alignment and thereby move the mutor $d$ from its zero position toward the position shown in Figure 1. If the rotation of the torque-responsive member be continued at a sufficiently high speed and no resistance be offered to the rotation of the driven member $g$ except its own inertia, the parts will quickly assume the positions shown in Figure 1, the spring $b^4$ being compressed by the forward movement of the bearing $b$ with the member $a$ of the torque-responsive element. If then resistance be offered to the rotation of the driven member $g$ the torque reaction, acting through the rotation of the shaft $g$, the nutation of the mutor $d$ and the rotation of the member $a$ of the torque-responsive element, will overcome in part the driving torque of the part $a^3$, $a^4$ and will permit the bearing $b$ and the part $a$ to yield to the action of the spring $b^4$, thereby bringing about a change in the relation of the parts of the variable speed transmission toward the zero condition, which will bring about a reduction in the speed of rotation of the driven member $g$ with an increase in the torque, it being assumed that the driving member $a^3$, $a^4$ continues to rotate at the same speed as before.

It has been assumed above that the action is automatic, but it will be understood that the speed ratio between the driver and the driven part can be controlled at the will of the operator through the application of force to the bearing $b$. The variation of the speed of rotation of the part $a^3$, $a^4$ will also bring about a change of the speed ratio as between the part $a^3$, $a^4$ and the driven part $g$.

While centrifugal force, acting through the link $c$, tends to move the parts from the zero positions to or toward the maximum speed positions shown in the drawing, it will be understood that this tendency is also increased by the nutating action of the mutor.

It will be understood that various changes in details of construction and arrangement can be made to suit different conditions of use, and that the invention, except as pointed out in the claims, is not limited to the particular construction and arrangement of parts shown and described herein.

I claim as my invention:

1. The combination of a variable speed transmission device having a nutating element capable of being changed in position to vary the speed ratio, a torque-responsive element having one part connected to said nutating element and the other part adapted to receive rotary movement, a longitudinally movable bearing for the first named part, means to support said bearing, means tending normally to move said bearing in one direction, and independent means under the control of the operator to move said bearing in opposition to the last named means.

2. The combination of a variable speed transmission device, the elements of which are capable of being changed in position with respect to each other to vary the speed ratio, a torque-responsive element having one part connected to one element of the transmission device and the other part adapted to receive rotary movement, an unbalanced member being included in the connection to the transmission device and subject to centrifugal action and tending to shift the transmission device toward the position of maximum speed, and supporting means.

3. The combination of a variable speed transmission device the elements of which are capable of being changed in position with respect to each other to vary the speed ratio, a torque-responsive element having one part connected to one element of the transmission device and the other part adapted to receive rotary movement, an unbalanced member being included in the connection to the transmission device and subject to centrifugal action and tending to shift the transmission device toward the position of maximum speed, means acting constantly in opposition to such centrifugal action, and supporting means.

4. The combination of a variable speed transmission device the elements of which are capable of being changed in position with respect to each other to vary the speed ratio, a rotatable shaft, torque responsive means connected between said rotatable shaft and one of said transmission elements, said torque responsive means having operatively connected therewith a part responsive to centrifugal force to shift one of the transmission elements toward the position of maximum speed transmission, and automatically acting means acting yieldingly in opposition to said centrifugal responsive part and tending to shift the last mentioned transmission element from said position of maximum speed transmission.

5. The combination of a variable speed transmission device the elements of which are capable of being changed in position with respect to each other to vary the speed ratio, a rotatable shaft, torque responsive means connected between said rotatable shaft and one of said transmission elements, a part operatively related to said torque responsive means and responsive to increases of speed for automatically shifting one of said transmission elements toward the position of maximum speed transmission, automatically acting means also operatively related to said torque responsive means and acting yieldingly in opposition to the said speed responsive means and tending to move the said transmission element from said position of maximum speed transmission, said automatically acting means being incapable alone of overcoming the action of the said speed responsive means but being capable in conjunction with torque reaction on the associated transmission element, of overcoming said speed responsive means.

This specification signed the 24 day of August A. D. 1922.

CARL W. WEISS.